(No Model.)

S. D. CHERRY.
Fruit Drier.

No. 231,009.  Patented Aug. 10, 1880.

Witnesses:
N. C. McArthur
John C. Rogers

Inventor.
S. D. Cherry.
per T. H. Alexander
Attorney.

N. PETERS, PHOTO-LITHOGRAPHER, WASHINGTON, D. C.

UNITED STATES PATENT OFFICE.

SAMUEL D. CHERRY, OF SENECA CITY, SOUTH CAROLINA.

FRUIT-DRIER.

SPECIFICATION forming part of Letters Patent No. 231,009, dated August 10, 1880.

Application filed June 21, 1880. (No model.)

*To all whom it may concern:*

Be it known that I, SAMUEL D. CHERRY, of Seneca City, in the State of South Carolina, have invented certain new and useful Improvements in Fruit-Driers; and I do hereby declare that the following is a full, clear, and exact description thereof, reference being had to the accompanying drawings, and to the letters of reference marked thereon, which form part of this specification, in which—

Figure 1:
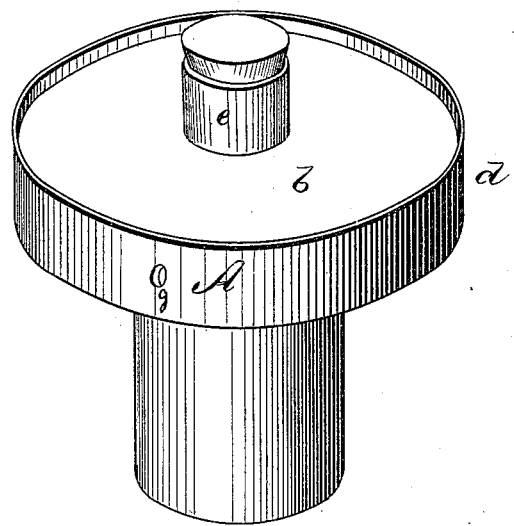
Figure 2:
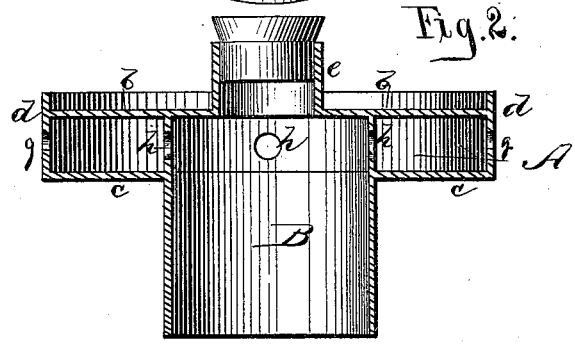
Figure 3:
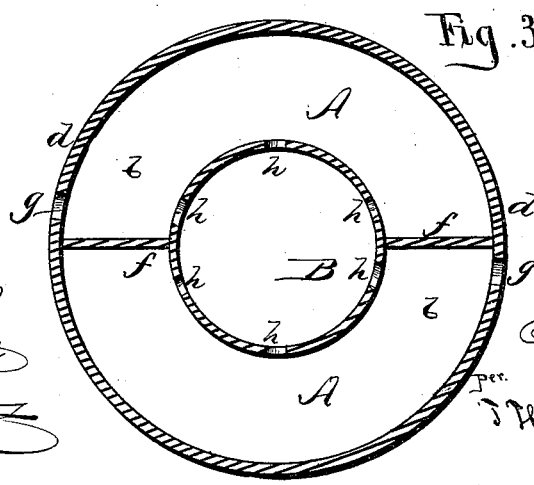

Figure 1 is a perspective view; Fig. 2, a vertical section, and Fig. 3 a horizontal section.

The object I have in view is to provide an efficient and economical fruit and vegetable drier; and to this end my invention consists in the peculiar construction of the evaporator, whereby it is adapted to be used in connection with a tea-kettle, boiler, or other suitable vessel for heating water, and thus rendering it essentially an article of domestic or family use.

In order that others may avail themselves of the benefits of my invention, I will now proceed to describe its construction and method of operation.

A represents a circular chamber, composed of the roof $b$, floor $c$, and rim $d$. The roof $b$ is provided with an upwardly or outwardly projecting flange, and also with a central hole, in which is secured the tube $e$. The chamber is furnished with partition $f$, for the purpose of more equally distributing the steam, and thus uniformly heating the roof. The rim $d$ is supplied with small holes $g\ g$ for the escape of the steam.

B represents a tube or cylinder, which extends through the floor, and having its upper end soldered to the under side of the roof. This tube is provided with holes $h\ h$ for the admission of steam into the chamber A.

It should be observed that the tube B is much larger in diameter or circumference than tube $e$, as it is intended to fit in the mouth of a tea-kettle, boiler, or other suitable vessel.

The tube $e$ is furnished with a cork, which may be removed, when it is desired, either to replenish the boiler with water or to permit the rapid escape of the steam.

The operation of my evaporator is as follows: The tube B being properly adjusted over a vessel for heating water, the fruit or vegetables to be cured are spread upon the roof. The steam-filling chamber A will evaporate the moisture from the fruit, while the heat radiating from the stove will assist in the operation and impart a beautiful color to it.

The advantages which obviously belong to an evaporator of the nature herein described are, first, its economy of construction; second, its simplicity in the method of operation; and, third, its adaptability to domestic or household purposes.

Having thus clearly set forth my invention, what I claim, and desire to secure by Letters Patent, is—

1. In a fruit and vegetable drier, the chamber A, composed of rim $d$, roof or tray $b$, floor $c$, and tube B, the latter extending through the floor and secured on the under side of tray $b$, and furnished with orifices $h\ h$, through which steam is admitted to the chamber, and orifices $g\ g$ in the rim, through which it is discharged, all substantially as herein set forth.

2. The within described fruit-drier, consisting of rim $d$, roof or tray $b$, floor $c$, tubes B $e$, partitions $f\ f$, and orifices $g\ h$, all as and for the purpose described.

In testimony that I claim the foregoing as my own I affix my signature in presence of two witnesses.

S. D. CHERRY.

Witnesses:
LIZZIE J. WOOLBRIGHT,
MARY A. BOLT.